Aug. 2, 1966  W. W. NUGENT ETAL  3,263,882
FORMING APPARATUS
Filed March 9, 1965  2 Sheets-Sheet 1
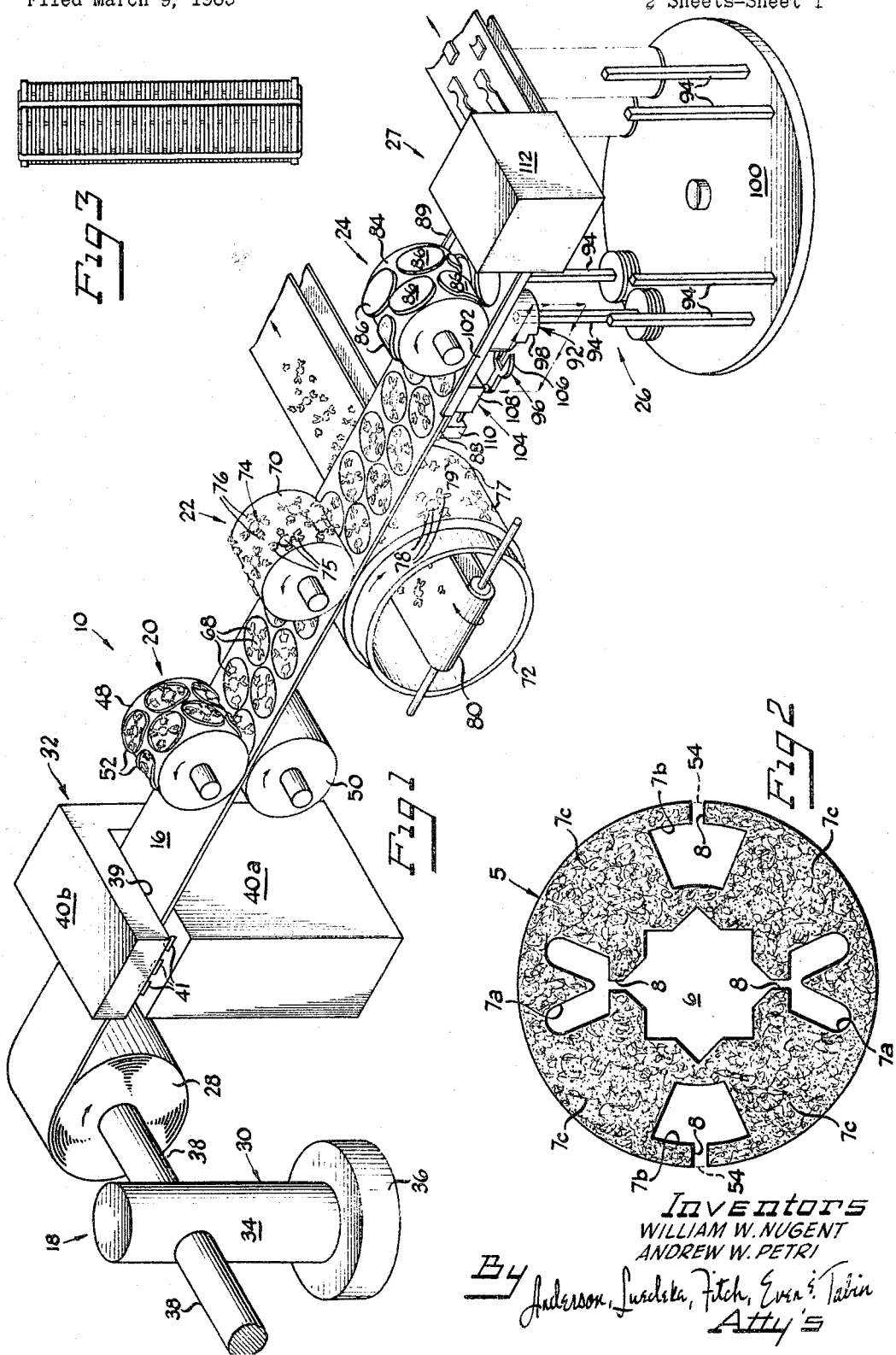
Inventors
WILLIAM W. NUGENT
ANDREW W. PETRI
By Anderson, Luedeka, Fitch, Even & Tabin
Atty's

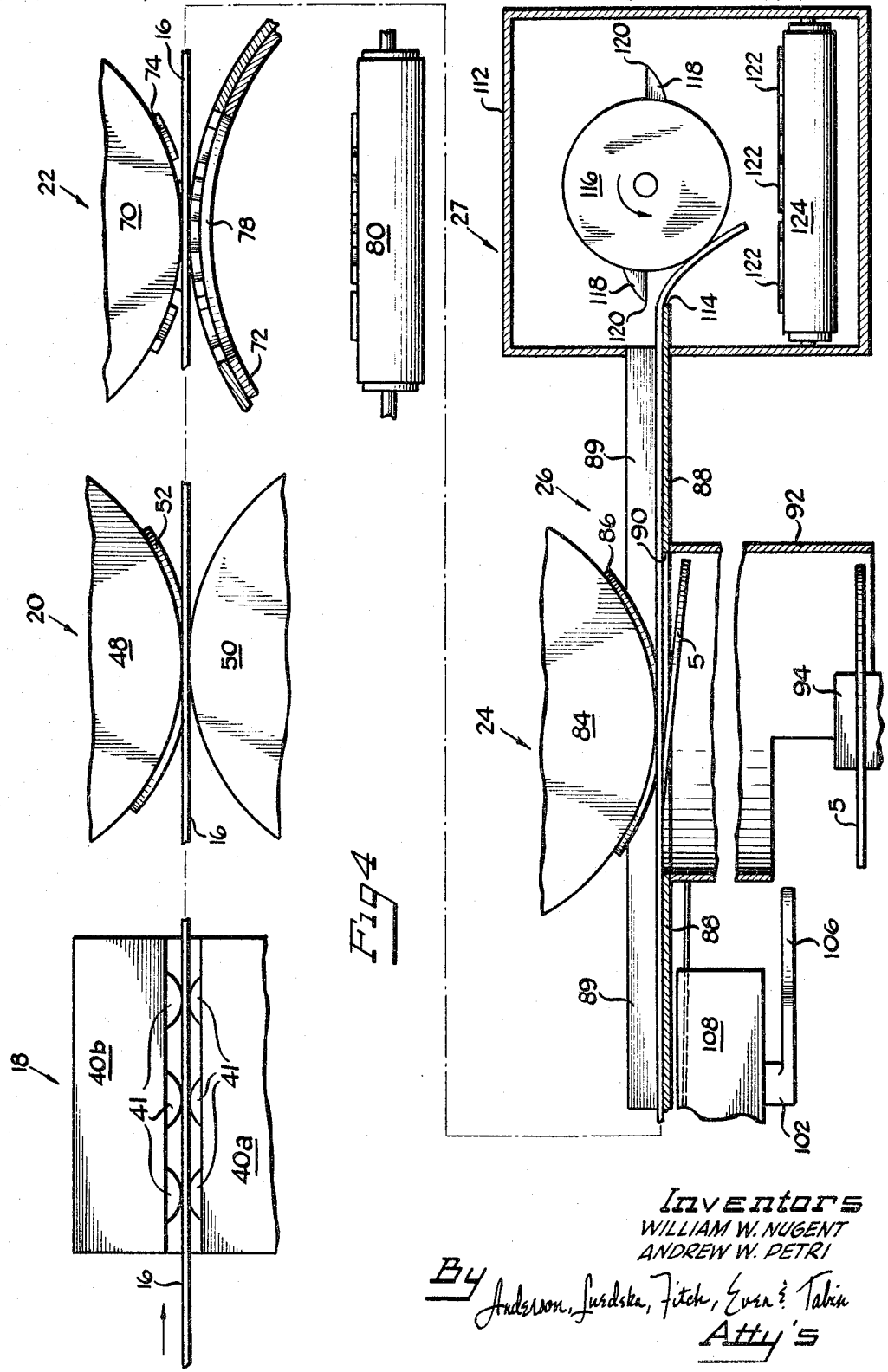

United States Patent Office 3,263,882
Patented August 2, 1966

3,263,882
FORMING APPARATUS
William W. Nugent, Kenilworth, and Andrew W. Petri, Morton Grove, Ill., assignors to Wm. W. Nugent & Co. Inc., Skokie, Ill., a corporation of Illinois
Filed Mar. 9, 1965, Ser. No. 438,222
13 Claims. (Cl. 225—2)

The present invention relates generally to the production of flat elements such as discs from sheet stock. It relates more particularly to an improved method and apparatus for the continuous production of such elements and the subsequent arrangement thereof in the form of stacks in which the elements are rotationally oriented in a predetermined manner relative to one another.

Cartridges for oil filters utilized with heavy pieces of machinery frequently comprise a stack of filter discs formed from a suitable fibrous sheet material such as wood pulp, paper, felt or spun glass that is capable of affording filtering action to liquid forced through it under pressure. A particularly effective and economical filter cartridge of this type may be provided by using generally identical filter discs and stacking them coaxially but rotationally oriented in a determined pattern or sequence relative to one another. Such a filter cartridge is disclosed in United States Letters Patent, No. 2,604,994, and a filter disc 5, similar to the disc 50 used to form the cartridge of the patent, is shown in FIGURE 2 of the present application. Very generally, the disc 5, as shown in FIGURE 2, is of circular configuration and is provided with a central opening 6 having the configuration of an eight-pointed star or two squares of equal area superimposed one upon the other but forty-five degrees out of phase. Four apertures 7 are circumferentially spaced around the disc ninety degrees from each other intermediate the central opening and the outer periphery of the disc. One pair of diametrically opposed apertures 7a are generally V-shaped; a second pair lying on a diameter normal to that of the first pair are generally of trapezoidal configuration. The adjacent apertures 7 are separated from each other by imperforate spaces 7c. The apertures 7 of the disc are each in communication with either the central opening 6 or with the outside of the disc through a restricted passageway 8, with the pair of diametrically opposed apertures 7a communicating with the central opening 6 and with the remaining pair of diametrically opposed apertures 7b communicating with the outer periphery of the disc.

The filter discs 5 are stacked coaxially to form filter cartridges 9 (FIG. 3). Each successive disc 5 in a cartridge 9 is rotated forty-five degrees relative to the immediately preceding disc so that the apertures 7, while in vertical alignment with other apertures, are separated from the next vertically adjacent aperture by an imperforate area 7c. Also, each V-shaped aperture 7a is vertically aligned with and immediately separated from a trapezoidal-shaped aperture 7b by an area 7c. This pattern is repeated through the entire stack.

In operation, oil exposed to the outer surface of the stack enters those apertures 7b having passageways 8 extending to the periphery of the stack. The oil filters through an imperforate area 7c immediately above or below into the next vertically adjacent aperture 7a and then passes through the passageway 8 of that disc leading to the central opening 6, from whence it is exhausted from the filter.

Previously, such filter discs were produced by a punch press which received a web of fibrous filter material intermittently fed to the press from a roll. The web would stop, the press would operate to punch out a pair of discs, and the web would move or index to position fresh material in the press. After the discs had been so formed, they would be moved to a stacking station where they were stacked on a spindle. To arrange the discs with each successive disc rotated a determined angle with respect to the immediately preceding disc, the spindle was rotated the determined angle after receiving each disc. Thus, the filter discs were produced in a predetermined fixed orientation, and the desired angular displacements were achieved by indexing the spindle on which the discs were stacked. After the spindle had received a given quantity of discs, the operator halted production, removed the filled or partially filled spindle, and replaced it with an empty one. The filter discs were later removed from the spindles and formed into cartridges.

A number of disadvantages of the prior art apparatus are apparent. It was time-consuming to constantly stop the movement of the web to punch out the discs. Further, it was time-consuming to stop the production to change the spindle. In addition, a rather elaborate spindle supporting and indexing mechanism to operate in synchronization with the production of the discs was required.

Accordingly, it is a principal object of the present invention to provide a novel and improved method and apparatus for continuously producing flat elements such as discs from sheet stock.

An additional object of the invention is to provide a novel and improved apparatus for continuously producing stacked units, each of which is made up of discs stacked in positions of predetermined relative orientation.

It is another object of the present invention to produce pre-oriented discs for such stacked units so that the discs may be stacked directly in their positions of predetermined orientation.

Another object of the invention is the provision of novel and improved methods and apparatus for continuously producing stacks of filter discs in which each disc is oriented in a predetermined manner relative to the other discs.

A more specific object of the present invention is to provide a method and apparatus for continuously producing a stack of filter discs in which the discs are arranged coaxially with each successive disc rotated a determined angle with respect to the immediately preceding disc.

It is still another object of the present invention to provide such novel and improved method and apparatus for continuous high speed production of such a stack of filter discs in which it is unnecessary to stop the strip from which the discs are formed for the various forming or separating operations or for replacement of the spindles on which the discs are received and stacked.

Another object of the invention is to provide a simple, economical, yet durable and dependable apparatus for producing such filter units.

Other objects and advantages of the present invention will become more apparent from the following description and the associated drawings, wherein:

FIGURE 1 is a schematic perspective view, with parts broken away, of portions of an apparatus for continuously producing stacked oil filter discs, said structure presenting a preferred embodiment of the apparatus of the invention and being adapted to operate in accordance with the method of the invention;

FIGURE 2 is an enlarged plan view of one filter disc of a stack produced by the apparatus shown in FIGURE 1;

FIGURE 3 is an enlarged side view of a filter cartridge formed from one of the stacks produced by the apparatus shown in FIGURE 1; and FIGURE 4 is an enlarged fragmentary side view of portions of the apparatus shown in FIGURE 1.

Briefly, in a continuous operation in accordance with the apparatus of the present invention, as shown in the illustrated embodiment thereof, disc-like elements shown in the form of filter discs 5 but which may assume various other configurations, particularly in so far as their interior configuration is concerned, are cut and separated from a continuously moving web of material and are arranged to form a stack in which each disc occupies a predetermined orientation relative to other discs in the stack.

The illustrated apparatus 10 is operable to continuously produce the stack of oil filter discs 5 by cutting and separating identical filter discs from a continuously moving web 16 and arranging the discs coaxially. The apparatus 10 includes a feeding section 18, which supplies the web 16, a cutting section 20, which inscribes the outline of the discs in the web, two separating sections 22 and 24, which remove portions of the discs and later the discs themselves from the web, a stacking section 26 and a scrap disposal section 27. The discs 5 are formed in the cutting section 20 in rows in the strip 16, with each successive disc in a row being oriented a determined angle of rotation with respect to the orientation of the immediately preceding disc. The discs are separated from the strip in the sections 22 and 24 and are stacked without further change in orientation with respect to one another, the resultant stacks being thereby automatically formed with each successive disc rotated the determined angle. The stacking section 26 includes provision for removal of a completed stack while the apparatus continues to operate and while a new stack is being formed. In the scrap disposal section 27, the remainder of the web, from which the discs have been removed, is chopped into manageable pieces and deposited in a suitable receptacle (not shown). Thus, the operation is high speed and continuous, eliminating stopping of the web for the cutting or separating operations or for removing completed stacks of discs.

Now considering the illustrated apparatus 10 in further detail, as shown in FIGURE 1, the web 16 is normally supplied in the form of a supply roll or coil 28 which is continuously unwound and fed through the apparatus. The web 16 may be of any suitable fibrous sheet material, such as mentioned above, that is capable of affording filtering action to oil forced through it under pressure. The thickness of the illustrated web 16 is about 0.079 inch but this thickness may vary according to the requirements of filtering.

*Feeding section*

The feeding section 18 of the illustrated apparatus 10 supplies the web 16 to the succeeding stations 20, 22 and 24 and includes generally a coil support 30 and a puller-straightener 32. The coil support 30 includes a vertical post 34 mounted at its lower end for rotation about its vertical axis on a base plate 36. A pair of horizontally extending supply coil supporting shafts or mandrels 38 extend outwardly from the upper end of the vertical post in opposite directions, each arm being adapted to support a supply coil 28 of the web adjacent its outer end.

As shown in FIGURE 1, the coil support 30 is positioned relative to the remainder of the apparatus so that the web 16 delivered from a supply coil 28 mounted on one of the mandrels 38 is directly in line with the other sections of the apparatus. When the post 34 is rotated through 180°, a supply roll supported on the other of the mandrels 38 will be similarly positioned. Thus a fresh coil may be supplied to the apparatus in a very short time when a coil becomes exhausted, it being necessary merely to rotate the coil support 30 and attach the leading end of the fresh coil to the trailing end of the exhausted coil. The fresh coil may be placed on the alternate mandrel while the apparatus is operating and while a coil supported on the opposite mandrel is being fed. The coil support 30 may be releasably locked in the illustrated feeding position by suitable means (not shown), and includes drive means (not shown) for continuously unwinding the supply coil 28 in synchronization with the speed of other parts of the apparatus, soon to be described.

The puller-straightener 32 of the feeding section 18 is positioned downline from the roll 28, to the right as viewed in FIGURE 1, and defines a mouth 39 through which the web 16 is passed. More specifically, the puller-straightener includes a base portion 40a and an overhanging support 40b spaced from the upper surface of the base to define the mouth 39. Three longitudinally spaced sets of transversely extending flattening rolls 41 are rotatably mounted on the puller-straightener 32 with one roll of each set being supported by the base 40a and the other roll of each set being mounted on the overhanging support 40b. The nips of the rolls are located within the mouth 39 through which the web passes. The flattening rolls 41 which are continuously rotated by suitable drive means (not shown) in synchronization with the speed of travel of the web, serve to flatten or straighten the web and, in particular, to remove any bow or wave from the web before it goes to the cutting section 20. Preferably, the supply roll and the flattening rolls are driven independently of the cutting and separating means to prevent excessive strain or tension on the web which could cause it to distort or rupture.

Guide means (not shown) are provided to longitudinally align the web 16 in a precise desired location before it enters the cutting section 20. Such guide means are preferably located before the puller-straightener 32, but may also be positioned after the puller-straightener.

The web 16 continues from the feeding section 18 to the cutting section 20 where the outlines of the filter discs 5 are cut or inscribed in the continuously moving web.

*Cutting section*

The illustrated cutting section 20 is located immediately downline from the feeding section 18 and includes a pair of generally cylindrical continuously rotating forming rolls, namely, an upper cutting roll 48 and a lower platen roll 50, between which the web 16 passes. Cutting dies 52 are secured to the upper cutting roll 48, the cutting being thereby effected when the web is engaged between a die 52 and the platen roll 50.

The rolls are spaced from one another so as to provide a clearance between the dies 52 and the platen roll 50, thereby preventing an actual contact therebetween which would dull the dies. Because of this slight clearance, the dies do not penetrate the entire thickness of the web. Rather, about .001 of an inch of material is left uncut to retain the cut portions together until they are subsequently separated, as will be explained below. Further, a working cut 54 (indicated by broken line in FIGURE 2) is made across the outside end of each passageway 8 extending from an aperture 7b to the outer edge of the disc to facilitate the removal of the portions of material occupying these apertures and the associated outer passages 8, as will also be explained more fully.

More specifically, the illustrated rolls 48 and 50 are mounted for rotation about transversely extending horizontal axes. The cutting roll 48 includes suitable quick-release fasteners or means such as bolts (not shown) to firmly support the cutting dies 52 around the periphery of the cutting roll and to permit the dies to be readily changed for production of different sized discs. The cutting and platen rolls are supported and positioned so as to cause the dies to exert a relatively high pressure on the web 16 passing between the forming rolls 48 and 50 so that the cutting dies 52 produce clean and sharp disc-defining cuts in the web. The surface of the platen roll 50 is smooth, and the roll is preferably constructed of a hard material such as steel or brass, although a material such as hard rubber may be used. The platen roll 50 may also include means to maintain the web in the proper longitudinal alignment relative to the rolls, and is preferably adjustably mounted in a manner permitting the desired high pressure to be maintained on the web and also permitting the maintenance of the proper alignment of the web. Inasmuch as die sharpening will alter the effective diameter of the cutting roll, a micrometer adjustment system (not shown) is incorporated in the structure to accurately maintain the clearance between the rolls. Means (not shown) are also provided for holding the web down flat while it is being cut. Drive means (not shown) rotate the forming rolls 48 and 50 in synchronization with the speed of travel of the web 16.

The illustrated dies 52 are generally curved to conform to the curvature of the cutting roll 48 and are each identical, being formed to cut the web 16 to outline one of the discs 5. As shown best in FIGURE 2, each die 52 provides cuts which form the circular outline of the disc, its central opening 6, its apertures 7 and its passages 8, and also provides the working cuts 54 associated with the disc. The illustrated cutting roll 48 is provided with two series of the cutting dies 52 for simultaneously cutting two identical continuous rows or series of filter discs in the web. However, the discs of each row are staggered relative to the discs of the adjacent row to permit use of a narrower width of stock and to minimize waste.

The cutting dies 52 in each series are arranged to cut the discs in a pre-oriented manner so that no further orientation is needed when the discs are placed in a stack. More particularly, each series includes four of the cutting dies 52 which are circumferentially equally spaced around the cutting drum 48 to engage the web at equally spaced intervals along its length. Each die in a series is rotated 45° about its own axis, i.e., an axis extending radially from the axis of rotation of the roll, and passing through the center of the die, with respect to the immediately preceding cutting die. One complete revolution of the cutting roll 48 thus produces a portion of a stack of filter discs, i.e., four discs which are successively rotated 45°. While these four discs involve a total of only a 180° rotation, because of the symmetry of the discs, as noted above, they provide a complete set in that the first disc to be produced in each set is angularly oriented 45° from the last disc of the preceding set. The continuous rotation of the cutting roll will continuously repeat the cycle of eight discs along the web to provide the two parallel rows of discs in which each disc is rotated about its axis 45° from the immediately preceding disc in its row.

The illustrated apparatus is designed to produce over 12,000 discs per hour. To accomplish this the rolls operate at about 25 revolutions per minute and the web travels at a speed of approximately fifty feet per minute.

*Separating sections*

That portion of the web in which the filter discs 5 are cut passes next into the first separating or knockout section where the portions or segments 68 of the web within the central opening 6, within the apertures 7a and 7b, and within the passages 8 of each disc, are removed. The separating section 22 is somewhat similar to the cutting section 20 in that the web is passed between a pair of continuously rotating generally cylindrical separating rolls, namely, an upper knockout roll 70 and a lower apertured roll 72.

The separating section 22 is located downline of the cutting section 20, and the rollers 70 and 72 are rotatably mounted for rotation about generally horizontal, transversely extending axes. The upper knockout roll 70 is provided with clusters or arrangements 74 of formed projections 75 and 76, with the projections of each cluster being the shape of the respective portions 68 to be separated from the web.

More particularly, each cluster 74 includes a projection 75 which corresponds in configuration to the portion 68 in the central opening 6, the inner passages 8 and the V-shaped apertures 7a of a disc. Also included are a pair of projections 76 which correspond in configuration to the portions 68 in the trapezoidal apertures 7b and the associated outer passage 8 of the disc. The clusters 74 of projections 75 and 76 are positioned on the roll 70 in a manner similar to the positioning of the cutting dies 52 on the cutting roll 48. That is, the clusters 74 are arranged in two coextensive identical series with the clusters in each series staggered relative to the clusters in the adjacent series and spaced 90° apart around the roll and with each cluster in the series rotated 45° about its axis relative to the immediately preceding cluster. The knockout roll 70 is so proportioned and rotated by drive means (not shown) that the projections 75 and 76 mate or align precisely with respective associated portions 68 of the discs incident to the rotation of the roll 70 and movement of the web 16.

The lower apertured roll or drum 72 is a large hollow generally thin-wall cylinder having clusters 77 of apertures 78 and 79 that each correspond to a cluster 74 of the projections 75 and 76. Thus, the clusters 77 of apertures 78 and 79 are positioned in two side-by-side rows around the large apertured roll 72 with the circumferential distance between clusters of apertures being the same as that between clusters of projections. Also, the clusters 77 of apertures 78 and 79 are each rotated 45° relative to the preceding cluster. The apertured roll 72 is so proportioned and rotated by drive means (not shown) that, incident to the rotation of the roll 72 and movement of the web 16, the apertures 78 and 79 mate or align precisely with the same respective associated portions 68 with which the projections 75 and 76 align, and do so simultaneously with the projections 75 and 76. The knockout rolls 70 and 72 are so positioned that when the projections 75 and 76 and the apertures 78 and 79 are so aligned, the projections extend downwardly into the respective mating apertures. This serves to push the aligned portions 68 of web material down through apertures, separating the portions 68 from the web and causing them to fall through the apertures into the interior of the roll 72. As the web 16 passes continuously through the rolls 70 and 72 the portions 68 are separated from the discs and the web without disturbing the connection between the web and the discs. Suitable means may be provided for holding the web flat incident to this separating operation.

The separated portions 68 are removed by a transversely-extending conveyor 80 which has its rear end disposed within the roll 72 below the area of contact of the separating rolls 70 and 72 with the web. The conveyor 80 deposits the portions 68 in a convenient waste receptacle (not shown).

Next, with the cut discs 5 in place but with the portions 68 removed, the web 16 moves to the second separating or stripping section 24 of the apparatus where the discs are separated or stripped from the web. The separating section 24 strips a disc from each series in close succession and delivers them to the stacking section 26. The illustrated separating section 24 includes a generally cylindrical continuously rotating stripping roll 84 mounted above the path of the web on a transversely extending horizontal axis. The stripping roll 84 has generally the same proportions as the cutting roll 48 and the knockout roll 70, and stripping elements or arrangements 86 are removably secured on the stripping roll 84 in the same respective positions that the dies 52 have on the cutting roll 48. The stripping elements 86 are the size of the discs, and the stripping roll 84 is driven by suitable drive means (not shown) in synchronization with the speed of travel of the web and so that each element 86 aligns with a cut disc in the web incident to the rotation of the roll 84 and the movement of the web. A horizontal stripping plate 88 is disposed under the web beneath the stripping roll 84 and is provided with a vertical guide rail 89 along either longitudinal edge. The plate 88 is also provided with a pair of spaced, longitudinally extending slots 90 (FIGURE 4) which each align with the path of the stripping elements 86 at one side of the roll 86. The stripping plate 88 is positioned so that each stripping element 86 extends down into the associated slot 90 at the lowest part of its travel to separate or strip a disc from the web. As shown in FIGURE 4, each stripping element 86 pushes a mating disc downwardly through a slot 90 while the portion of the plate 88 surrounding the slot supports the web around that disc to facilitate the stripping action.

The portion of the web 16 from which the discs 5 have been removed continues to the scrap disposal section 27 where it is cut into convenient lengths for scrap.

*Stacking section*

The discs which are removed from the web 16 and urged downwardly through the slots 90 are received into one of a pair of generally cylindrical pipes 92 secured beneath the slots. The pipes not only receive the discs 5, but arrest their forward movement for vertical positioning on spindles 94 located beneath the pipes and in alignment therewith. The rearward portion of each pipe is cut away to permit entry of a pair of retainers 96 into the pipe, and each pipe is notched, as at 98, to accommodate movement of a spindle 94 past it. More particularly, the stacking section 26 includes a horizontal turntable 100 which is power driven for rotation about a vertical axis. The vertical spindles 94 are removably mounted in fixed positions on the turntable 100 in upwardly extending relation in a manner permitting them to be readily removed without the use of tools. Each of the spindles 94 is square in horizontal section and proportioned to pass through the central opening 6 of discs oriented in different angular positions, as noted above. The spindles 94 are located adjacent the edge of the turntable 100 in four pairs circumferentially equally spaced around the turntable. The turntable is positioned so that any desired pair of the spindles 94 may be located in loading position side-by-side below the stripping roll 84 with each of these spindles directly aligned with the axes of the pipes 92 of one row of discs, the notches 98 in the pipes being designed to accommodate the upper ends of the spindles as the turntable is rotated.

Thus, the spindles in the loading position simultaneously receive discs as they are stripped from the web and fall downwardly through the pipes. As shown best in FIGURE 4, the upper ends of the spindles 94 are about 6 inches directly below the web. The discs 5 in each row are thus stacked upon a spindle 94, and it will be noted that each successive disc is rotated the desired 45° with respect to the immediately preceding disc without any movement of the spindles or reorientation of the discs. Because the discs as presented to the spindles are already in the determined rotational positions, the spindles need not be rotatable and the construction of the spindles and turntable can therefore be relatively simple and inexpensive.

When sufficient filter discs 5 have been accumulated or stacked on a pair of spindles 94 so as to approach the capacity of the spindles, a pair of empty spindles is substituted by rotating the turntable 100 through an angle of 90°. In this manner, the exchange of spindles may be accomplished in a very short period of time.

In order that the operation of the machine need not be halted when the spindles are exchanged, the retainer 96 is provided and is operative to receive those discs which are produced during the period which elapses between the removal of one spindle and the insertion of another. When the pair of empty spindles has been moved into place, the retainer deposits the accumulated discs thereon and is moved to an out-of-the-way position.

More specifically, the retainer 96 comprises a downwardly extending arm 102 connected at its upper end to a pneumatic cylinder arrangement 104 and having mounted on its lower end a bifurcated platform 106. The pneumatic cylinder arrangement includes a pneumatic vertical locator 108 which is supported on a track beneath the plate 88 for movement toward and away from the pipes 92 in a path parallel to the longitudinal axis of the machine. The vertical locator supports the pair of arms 102 and effects vertical movement of these arms, as will become apparent shortly. The vertical locator 108 is moved along the track by a pneumatic positioner 110.

In operation, when it is desired to remove a pair of spindles 94, the pneumatic cylinder arrangement 104 is operated by causing the vertical locator 108 to raise the platform 106 to its highest position, above the upper ends of the spindles, and by causing the positioner to move the arm 102 to a position in which the bifurcated platform 106 is positioned within the pipe 92 in a position in which it receives the discs entering the pipe. The cut-away portion of the pipe accommodates the platform for movement inwardly and outwardly thereof. The presence of the platform within the pipe prevents further discs from engaging the spindle and makes it possible to rotate the turntable 100 to position an empty pair of spindles under the pipes 92. As soon as this has been accomplished, the arm 102 is lowered, causing the spindle to pass through the central opening 6 of the accumulated stack and between the fingers of the bifurcated platform 106. After the platform has been lowered a sufficient distance to cause the spindle to pass through all of the accumulated discs, the arm 102 is withdrawn by the positioner 110, permitting the discs to drop to the bottom of the spindle.

The scrap disposal section 27 includes a housing 112 which encloses the forward end portion of the stripping plate 88 which terminates in an abrupt edge 114. Mounted within the housing for rotation about a horizontal transversely extending axis is a cutter roll 116 having a pair of cutter elements 118 affixed to its surface in diametrically opposed relation to each other. Each element defines a sharp cutting edge 120 and the roll is positioned relative to the edge 114 of the stripping plate so that rotation of the roll will bring the cutting edges 120 of the cutter elements 118 into sufficiently close proximity to the edge 114 so as to periodically shear the web as it passes over the edge. Preferably, the axis of the roll is positioned only slightly above the plane of the plate so that the cutting edges 120 are moving in essentially a vertical path as they pass the edge 114 of the plate. In a preferred embodiment, the roll 116 rotates at such a speed that the web is cut into pieces 122 approximately three inches in length.

Positioned beneath the edge 114 of the plate 88 is a conveyor 124 which receives the pieces 122 and transfers them to a suitable receptacle (not shown). Of course, if space permits, the receptacle may be positioned directly beneath the housing 112, thus eliminating the need for the conveyor 124. The receptacles are preferably capable of being periodically sealed for shipment to a re-processing plant.

Thus, the illustrated filter unit producing apparatus provides continuous operation at high speed without stopping of the web for the cutting or other operations on the web or for the replacement of the spindles on which the discs are stacked. Further, the apparatus simply and automatically provides the discs in the desired angular relationships so that they need merely be stacked onto receiving spindles without any necessity for reorientation of the spindles or the discs. The apparatus illustrates a particularly effective mode of practicing the method of the invention.

Various modifications and changes may be made in the illustrated structure or in its particular manner of operation without departing from the spirit and scope of the present invention.

Various features of the present invention are set forth in the following claims.

What is claimed is:

1. A method for the continuous manufacture of stacks of disc-like elements with elements in each stack being disposed in predetermined non-identical rotational orientation with respect to an adjacent element, said method comprising the steps of continuously imparting cuts to a moving web to outline a series of longitudinally spaced elements in the web which are readily separable from the web, elements of the web being disposed in predetermined non-identical rotatative orientation relative to an adjacent element in the web in accordance with a predetermined pattern, continuously and sequentially separating the elements from the remaining portions of the moving web without appreciably disturbing the relative orientations of the elements, and continuously and sequentially stacking the elements without appreciably disturbing the relative orientations thereof.

2. A method for the continuous manufacture of filter units that are each made up of a stack of generally coaxially aligned fibrous filter discs with discs in each unit being disposed in a predetermined non-identical rotational orientation with respect to an adjacent disc, said method comprising the steps of continuously feeding a web of fibrous filter material from a supply thereof, continuously imparting cuts to the moving web to outline a row of discs in the web, the discs being spaced longitudinally along the web and being readily separable from the web, at least some of the discs being disposed in non-identical rotative orientation relative to a preceding or succeeding disc in the row in accordance with a predetermined pattern, continuously and sequentially separating the discs from the remaining portions of the moving web without appreciably disturbing the relative rotational orientations of the discs, and continuously and sequentially stacking the discs into filter units without appreciably disturbing the relative rotational orientations of the discs.

3. A method for the continuous manufacture of filter units that are each made up of a stack of generally coaxially aligned fibrous filter discs, each successive disc of a filter unit being rotated a determined angle with respect to the immediately preceding disc, said method comprising the steps of continuously feeding a web of fibrous filter material from a supply thereof, continuously imparting cuts to the moving web to outline a row of discs in the outlined web, the discs being spaced longitudinally along the web and being readily separable from the web, each successive disc in the row being rotatively oriented the determined angle with respect to the immediately preceding disc, continuously and sequentially separating the discs from the remaining portions of the moving web without appreciably disturbing the relative rotative orientations of the discs, and continuously and sequentially stacking the discs into filter units without appreciably disturbing the relative rotative orientations of the discs.

4. A method for the continuous manufacture of filter units that are each made up of a stack of generally coaxially aligned fibrous filter discs, each successive disc of a filter unit being rotated a determined angle with respect to the immediately preceding disc, said method comprising the steps of continuously feeding a web of fibrous filter material from a supply thereof, continuously imparting cuts to the moving web to outline a row of discs in the web, the outlined discs being spaced longitudinally along the web and being readily separable from the web, each successive disc in the row being rotatively oriented the determined angle with respect to the immediately preceding disc, continuously and sequentially separating the discs from the remaining portions of the moving web without appreciably disturbing the relative rotative orientations of the discs, and continuously and sequentially stacking the discs in vertical stacks by vertical movement of the discs from their respective positions in the web without appreciably disturbing the relative rotative orientations of the discs.

5. Apparatus for the continuous manufacture of stacks of generally coaxially aligned disk-like elements with elements of each stack being disposed in predetermined non-identical rotational orientations with respect to an adjacent element, said apparatus comprising means for continuously feeding a web of material from a supply thereof forwardly along a determined path, means disposed along the path of the web for continuously imparting cuts to the moving web to outline a row of longitudinally spaced elements in the web readily separable therefrom, at least some of the elements in the web being disposed in predetermined non-identical rotative orientation with respect to an adjacent element in the web, means disposed along the path of the web forwardly of said cutting means for continuously and sequentially separating the elements from the remaining portions of the moving web without appreciably disturbing the relative rotative orientation of the elements, and means disposed along the path of the web forwardly of said separating means for continuously and sequentially stacking the elements without appreciably disturbing the relative rotative orientations of the elements.

6. Apparatus for the continuous manufacture of stacks of generally coaxially aligned fibrous filter discs, each successive disc of a stack being rotated a determined angle with respect to the immediately preceding disc, said apparatus comprising feed means for continuously feeding a web of fibrous filter material from a supply thereof forwardly along in a generally horizontal level path, cutting means disposed along the path of the web for continuously imparting cuts to the moving web to outline a row of discs in the web, the discs being spaced longitudinally along the web and being readily separable from the web, the outline of each successive disc in the row being rotated the determined angle with respect to the immediately preceding disc, separating means disposed along the path of the web forwardly of said cutting means for continuously and sequentially separating the discs from the remaining portions of the moving web without appreciably disturbing the relative rotational angular positions of the discs, and stacking means disposed along the path of the moving web forwardly of said separating means for continuously and sequentially stacking the discs in vertical stacks by imparting vertical movement to the discs without appreciably disturbing the relative rotational angular positions of the discs.

7. Apparatus for the continuous manufacture of stacks of fibrous filter discs, discs in each stack being disposed in determined non-identical rotational orientations with respect to an adjacent disc, said apparatus comprising means for continuously feeding a web of fibrous filter material from a supply thereof forwardly along a determined path, cutting means disposed along the path of the web for continuously imparting cuts to the moving web to outline at least one row of discs in the web, the discs being spaced longitudinally along the web and being readily separable from the web, each disc including an irregularly-shaped inner portion readily separable from that disc, the discs being so positioned relative to one another in the web that they will be in their determined non-identical orientations with respect to one another when they are stacked into units, first separating means disposed along the path of the web forwardly of said cutting means for continuously and sequentially removing the irregularly-shaped portions of the discs without separating the discs from the web, said first separating means including a continuously rotating knockout roll disposed on one side of the path of the web and a continuously rotating apertured roll disposed on the opposite side of the path of the web and opposite said knockout roll, said knockout roll including at least one projection that conforms to the shape of an irregularly-shaped portion, said lower apertured roll including at least one aperture that conforms to the shape of said projection, said knockout roll and said apertured roll being proportioned, arranged, and operable to align said projection and said aperture with the irregularly-shaped portion of successive discs in the row incident to the rotation of the knockout and apertured rolls and the movement of the web, said projection extending into said aperture when they are so aligned to push the irregularly-shaped portion of the aligned disc through said aperture and thereby separate it from its disc without separating the disc from the web, second separating means disposed along the path of the web forwardly of said first separating means for continuously and sequentially separating discs from the remaining portions of the moving web without appreciably disturbing the relative rotational orientations of the discs, and stacking means disposed along the path of the web forwardly of said second separating means for continuously and sequentially stacking the discs without appreciably disturbing the relative rotational orientations of the discs.

8. Apparatus for the continuous manufacture of stacks of generally coaxially aligned fibrous filter discs, the discs in each stack being rotated about their respective central axes determined angles with respect to one another, said apparatus comprising means for continuously feeding a web of fibrous filter material from a supply thereof forwardly along a generally horizontal level path, cutting means disposed along the path of the web for continuously imparting cuts to the moving web to outline at least one row of discs in the web, the discs being spaced longitudinally along the web and being readily separable from the web, each disc including an irregularly-shaped portion readily separable from the remaining portions of that disc, the outlines of the discs being rotated determined angles with respect to one another, first separating means disposed along the path of the web forwardly of said cutting means for continuously and sequentially removing the irregularly-shaped portions of the discs without separating the discs from the web, said first separating means including a continuously rotating knockout roll disposed above the path of the web and a continuously rotating apertured roll disposed below the path of the web and below said knockout roll, said knockout roll including a series of projections which extend around said knockout roll and which each conform to the shape of an irregularly-shaped portion, said lower apertured roll including a series of apertures which extend around said apertured roll and each conform to the shape of said projection, said knockout roll and said apertured roll being proportioned, arranged, and operable to successively generally vertically align successive projections and respective successive mating apertures with the irregularly-shaped portion of respective successive outlined discs incident to the rotation of the knockout and apertured rolls and the movement of the web, said knockout roll and said apertured roll being proportioned and arranged so that incident to their rotation each projection extends into its mating aperture when the projection and the aperture are aligned to push the irregularly-shaped portion of the aligned disc down through said aperture and thereby separate it from its disc without separating the disc from the web, second separating means disposed along the path of the web forwardly of said first separating means for continuously and sequentially separating discs from the remaining portions of the moving web without appreciably disturbing the relative angular positions of the discs, and stacking means disposed along the path of the web forwardly of said second separating means for continuously and sequentially stacking the discs without appreciably disturbing the relative angular positions of the discs so as to provide a stack.

9. Apparatus for the continuous manufacture of stacks of generally coaxially aligned fibrous filter discs, the discs in each stack being rotated about their respective axes determined angles with respect to one another, said apparatus comprising means for continuously feeding a web of fibrous filter material from a supply thereof forwardly in a generally horizontal level path, cutting means disposed along the path of the web for continuously imparting cuts to the moving web to outline at least one row of discs in the web, the discs being spaced longitudinally along the web and being readily separable from the web, each disc having a center opening, the discs in the row being rotated at determined angles with respect to one another, separating means disposed along the path of the moving web forwardly of said cutting means for separating the discs from the remaining portions of the moving web by moving the discs vertically downward without appreciably disturbing the relative angular positions of the discs, stacking means disposed along the path of the web forwardly of said separating means for stacking the discs without appreciably disturbing the relative angular positions of the discs to provide the filter units, said stacking means comprising at least two vertically-extending horizontally-positionable spindles, said stacking means being operable to selectively move said spindles between a loading position below said separating means and vertically aligned with the path of the center openings of the filter discs for receiving the discs thereon or an unloading position laterally spaced from said loading position, and means selectively operable to divert discs separated from the web in the absence of a spindle in said loading position.

10. Apparatus for the continuous manufacture of stacks of generally coaxially aligned fibrous filter discs, the discs in each stack being rotated about their respective axes determined angles with respect to one another, said apparatus comprising means for continuously feeding a web of fibrous filter material from a supply thereof forwardly in a generally horizontal level path, cutting means disposed along the path of the web for continuously imparting cuts to the moving web to outline at least one row of discs in the web, the discs being spaced longitudinally along the web and being readily separable from the web, each disc having a center opening, the discs in the row being rotated at determined angles with respect to one another, separating means disposed along the path of the moving web forwardly of said cutting means for separating the discs from the remaining portions of the moving web by moving the discs vertically downward without appreciably disturbing the relative angular positions of the discs, stacking means disposed along the path of the web forwardly of said separating means for stacking the discs without appreciably disturbing the relative angular positions of the discs to provide the filter units, said stacking means comprising a horizontally movable base and at least two vertically extending spindles removably mounted on said base, said base being movable to selectively move each of said spindles between a loading position below said separating means and vertically aligned with the path of the center openings of the filter discs for receiving the discs thereon or in an unloading position from which said spindle can be readily removed from said base, and retaining means selectively positionable between said separating means and the loading position of said spindles for supporting discs separated from the web in the absence of a spindle in said loading position.

11. Apparatus for the continuous manufacture of stacks of generally coaxially aligned fibrous filter discs, the discs in each stack being rotated about their respective axes with respect to one another, said apparatus comprising means for continuously feeding a web of fibrous filter material from a supply thereof forwardly along a predetermined path, means disposed along the path of the web for continuously imparting cuts to the moving web to outline a row of discs in the web, the discs being spaced longitudinally along the web and being readily separable from the web, each of the discs having an identical center opening of polygonal configuration that is adapted to receive a square-shaped spindle therethrough in different rotational positions which differ from one another in multiples of a determined angle, the discs in said row being rotated about their respective axes in multiples of said determined angle with respect to one another in a repeating cycle, said cutting means comprising a pair of continuously rotating cutting rolls adapted to receive the continuously moving web therebetween and a plurality of identical cutting dies mounted on one of said cutting rolls, said dies being adapted to engage the web incident to each rotation of said one cutting roll so that each die imparts a cut to the web to outline one of the readily separable discs, said dies being arranged in a series extending circumferentially around said one roll and being rotated about their respective axes in multiples of said determined angle with respect to one another in accordance with one full cycle, separating means disposed along the path of the web forwardly of said cutting means for continuously and sequentially separating the discs from the web without appreciably disturbing the relative angular positions of the discs, stacking means disposed along the path of the web forwardly of said separating means for continuously and sequentially stacking the discs on a spindle of square cross section without appreciably disturbing the relative angular positions of the discs, whereby the discs are adapted to be stacked on a spindle in said relative angular positions in a manner preventing their rotation relative to one another.

12. Apparatus for the continuous manufacture of stacks of fibrous filter discs, the discs in each stack being positioned in determined non-uniform orientations with respect to one another, said apparatus comprising means for continuously feeding a web of fibrous filter material from a supply thereof forwardly along a determined path, a group of similarly proportioned and arranged rolls spaced along the path of the web, said group of rolls including at least one cutting roll and one separating roll, a series of cutting arrangements disposed on each of said cutting rolls and a series of separating arrangements disposed on each of said separating rolls, said arrangements being adapted to engage the web incident to the rotation of said rolls to respectively cut the discs in the web and separate the cut discs from the web, each of said series having its arrangements substantially identically placed relative to its associated roll, the arrangements in each of said series being disposed in the determined non-identical orientations relative to the other arrangements in the series, and synchronized drive means for continuously rotating all of said rolls at the same speed and so that corresponding arrangements in each series of arrangements will be sequentially aligned with the same portion of the continuously moving web.

13. Apparatus for the continuous manufacture of stacks of fibrous filter discs, the discs in each stack being rotated about their respective axes with respect to one another in a repeating cycle, said apparatus comprising means for continuously feeding a web of fibrous filter material from a supply thereof forwardly along a determined path, a group of similarly proportioned and arranged rolls spaced along the path of the web, said group including at least one cutting roll and one separating roll, a series of cutting arrangements disposed on each of said cutting rolls and a series of separating arrangements disposed on each of said separating rolls, said arrangements being adapted to engage the web incident to the rotation of said rolls to respectively cut the discs in the web and separate the cut discs from the web, each of said series having its arrangements substantially identically placed relative to its associated roll, the arrangements in each of said series being rotated about their respective axes with respect to one another in accordance with one full cycle, and synchronized drive means for continuously rotating all of said rolls at the same speed and so that corresponding arrangements in each series of arrangements will be sequentially aligned with the same portion of the continuously moving web.

No references cited.

WILLIAM W. DYER, Jr., *Primary Examiner.*

J. M. MEISTER, *Assistant Examiner.*